May 8, 1923.
D. C. BOYD
CHIP DISTRIBUTOR
Filed Feb. 6, 1922
1,454,575
5 Sheets-Sheet 1
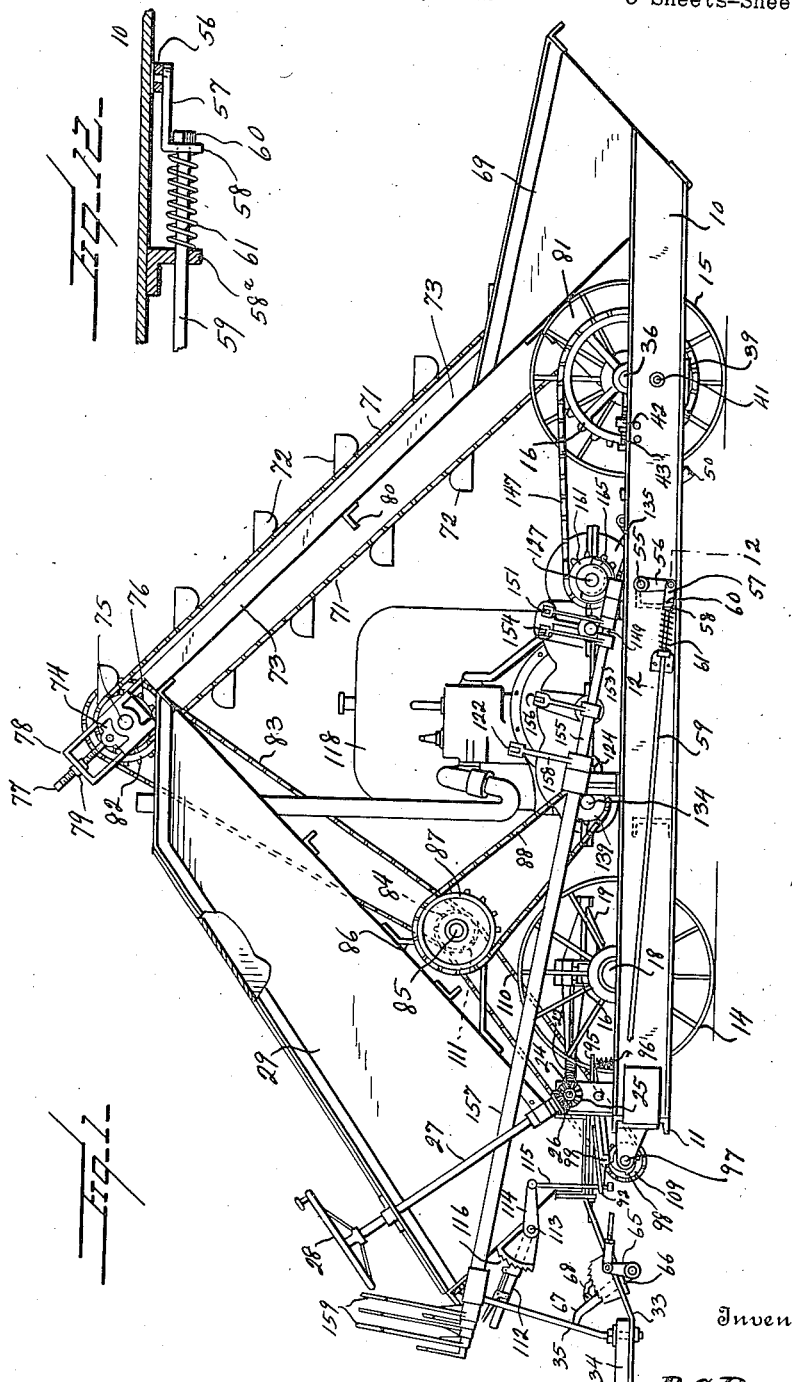

May 8, 1923.
D. C. BOYD
1,454,575
CHIP DISTRIBUTOR
Filed Feb. 6, 1922  5 Sheets-Sheet 2
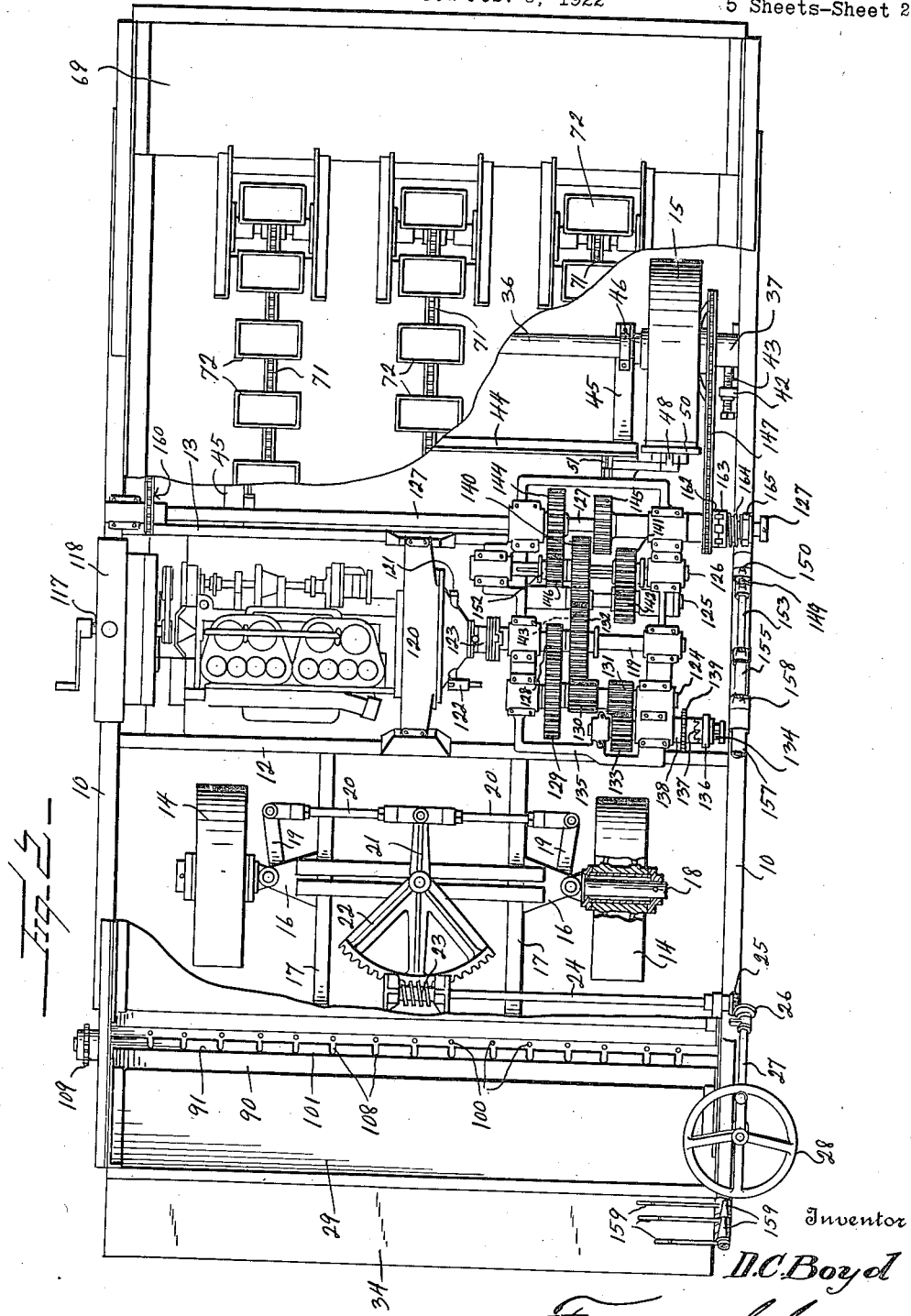
Inventor
D.C.Boyd
By Frederick S. Hitt
Attorney

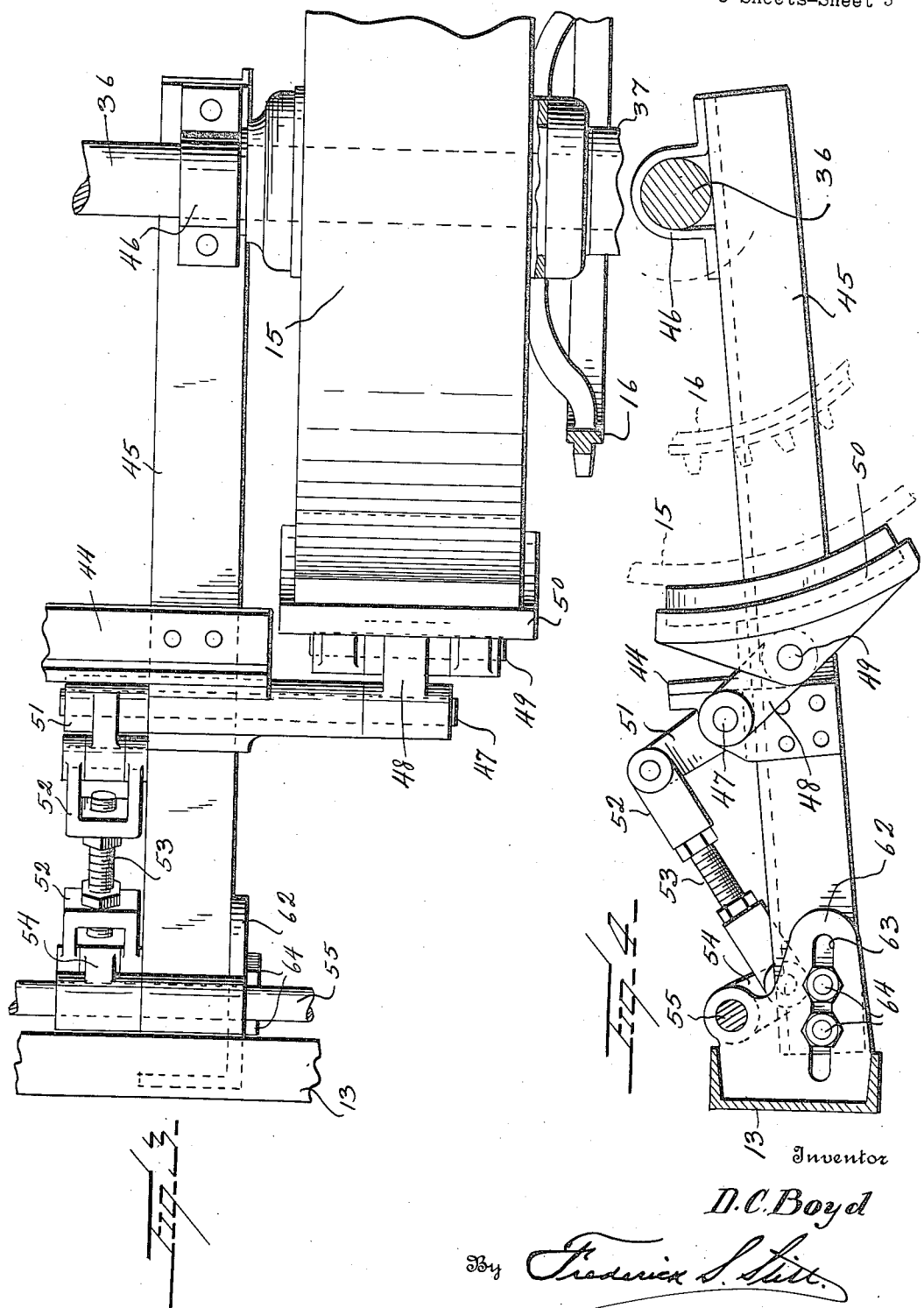

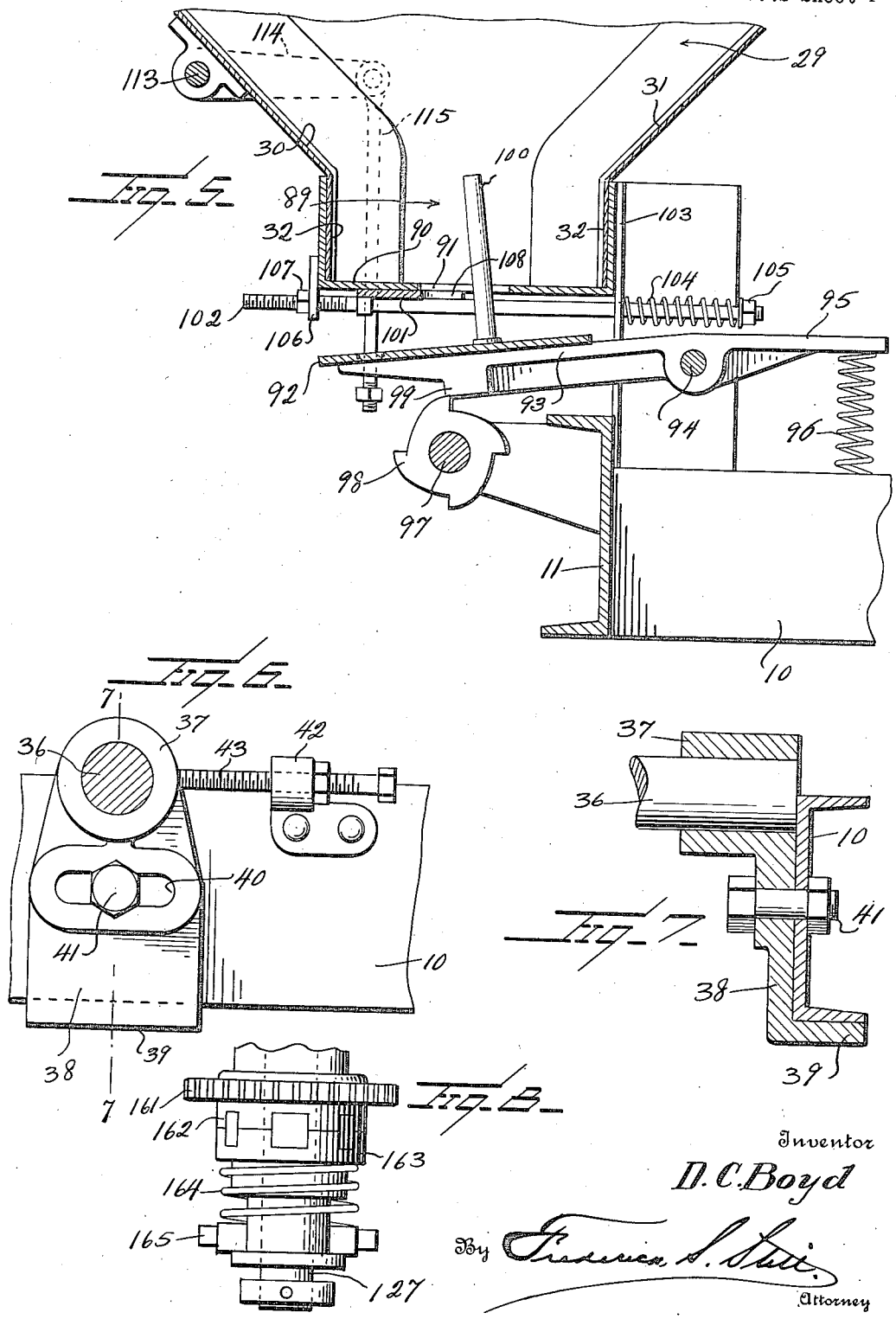

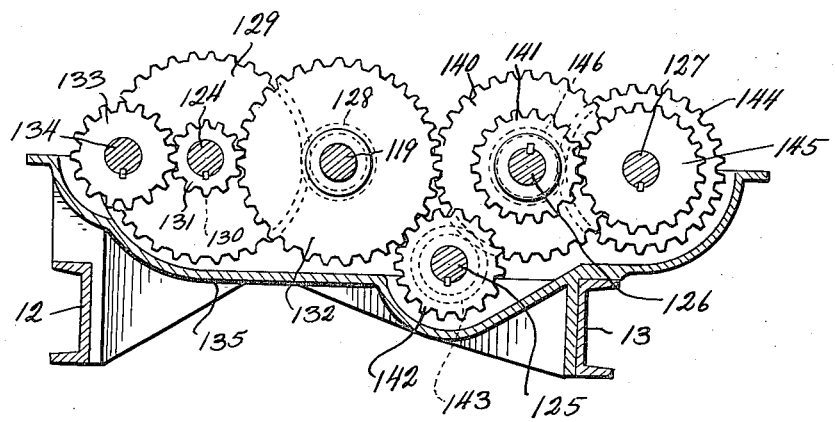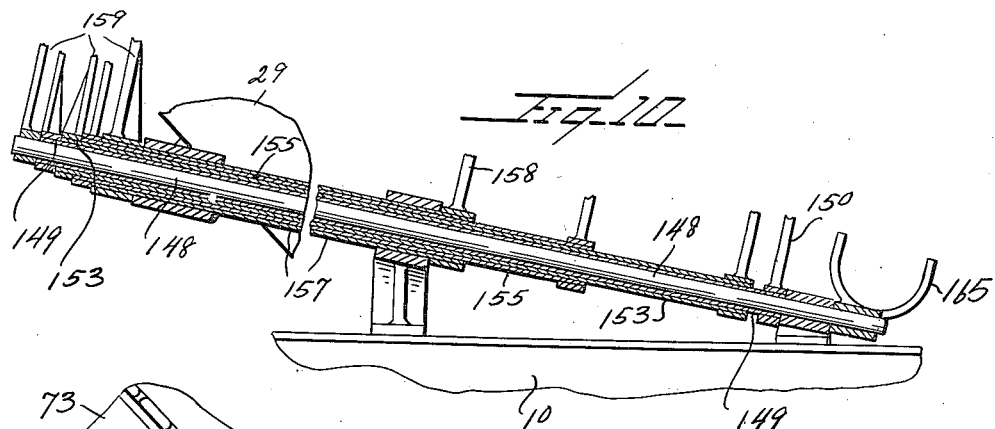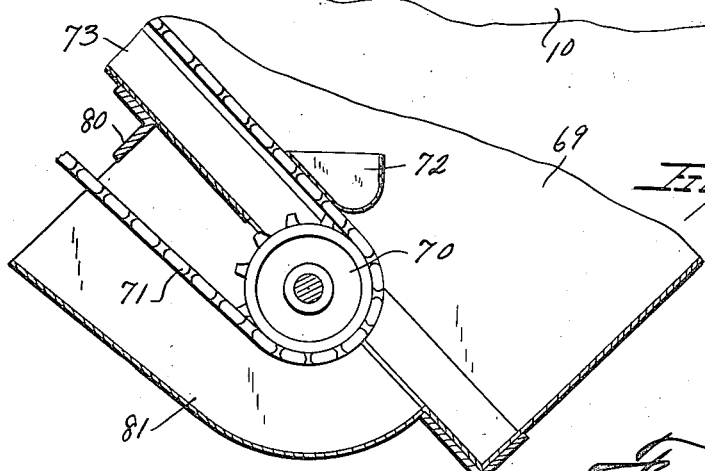

Patented May 8, 1923.

1,454,575

UNITED STATES PATENT OFFICE.

DAVID C. BOYD, OF GALION, OHIO, ASSIGNOR TO THE GALION IRON WORKS & MFG. CO., OF GALION, OHIO, A CORPORATION OF OHIO.

CHIP DISTRIBUTOR.

Application filed February 6, 1922. Serial No. 534,481.

*To all whom it may concern:*

Be it known that I, DAVID C. BOYD, a citizen of the United States, residing at Galion, in the county of Crawford and State of Ohio, have invented certain new and useful Improvements in Chip Distributors, of which the following is a specification.

This invention relates to machines for distributing stone chips, screenings, gravel, and broken stone, and particularly to a machine for distributing broken stone chips or the like over a tarred or otherwise treated road surface.

The general object of the invention is to provide a machine of this character which will have the gravel or broken stone distributing means disposed at the forward end of the machine so that the wheels of the machine may travel, not upon the tarred surface of the roadway, but upon the layer of broken stone or gravel which has been deposited thereon.

A further object is to provide a machine of this character which will distribute the chipped or broken stone, gravel, or other like material evenly and uniformly upon the tarred surface of the road, and further to provide means whereby the hopper of the machine may be kept filled with broken stone or the like received from trucks moving over that portion of the road upon which the gravel or screening have been applied.

A still further object is to provide a machine of this character with a hopper at its forward end, from which the broken stone, gravel, screenings, etc., are discharged upon the road, and provide means for agitating the broken stone within the hopper so as to prevent the material from clogging therein and not passing freely out of the discharge opening of the hopper.

Another object is to provide a distributing plate in connection with the discharge opening of the hopper, which distributing plate is oscillated so as to cause the uniform distribution of the broken stone, gravel or chips and to provide means whereby this distributing plate may be adjusted nearer to or further from the mouth of the hopper and whereby it may be shifted to a position to prevent the outward passage of material from the hopper.

Still another object in this connection is to provide means for controlling the flow of broken stone or chips from the hopper.

Still a further object is to provide a machine which may receive loads of broken stone, chips or gravel from trucks discharging at the rear end of the machine, and to provide means whereby the material so received in the receiving hopper will be carried over to and discharged into the distributing hopper.

Another object is to so design the machine that the weight will be evenly distributed, that it may be operated under its own power, and that it may be driven either forward or backward at different rates of speed.

Other objects have to do with the details of construction and arrangement of parts as will appear more fully hereinafter.

My invention is illustrated in the accompanying drawings, wherein:—

Figure 1 is a side elevation of my stone or chip distributing machine;

Figure 2 is a top plan view of the machine shown in Figure 1;

Figure 3 is an enlarged detail top plan view of the brake of one of the traction wheels, the sprocket wheel associated therewith being shown in section;

Figure 4 is a fragmentary longitudinal sectional view through the frame bar 13 and axle 36 showing the brake supporting mechanism and the brake in section;

Figure 5 is a fragmentary vertical sectional view through the distributing hopper and the distributing plate;

Figure 6 is a side elevation of the means for shifting the axle, the axle being in section;

Figure 7 is a sectional view on the line 7—7 of Figure 6;

Figure 8 is a detail top plan view of the differential clutch;

Figure 9 is a side elevation of the transmission gearing shafts and the gear case being shown in section;

Figure 10 is a longitudinal sectional view of the concentric control shafts;

Figure 11 is a fragmentary vertical sectional view through the receiving hopper, one of the boots therefor and one of the conveyors;

Figure 12 is a sectional view through one of the frame beams 10 showing the manner in which the brake rod is connected to the brake mechanism.

From the drawings it will be seen that my machine, generally speaking, comprises a wheel supported frame having a front or distributing hopper, a rear or receiving hopper, a plurality of elevators carrying the material from the rear receiving hopper and distributing it into the upper end of the distributing hopper, that the machine is provided with front steering wheels and rear drive wheels, that the rear drive wheels and the several elevators or carriers are driven from a motor mounted upon the frame between the forward and rear wheels thereof, and that the controlling means for the motor or engine whereby the machine is driven forward or backward and at any desired speed or stopped altogether is disposed at the forward end of the machine so that the operator located at the forward end of the machine may have complete control of the machine as regards its speed and direction, thus permitting the operator to concentrate his attention upon the roadway and manipulate the controls of the machine in such fashion as will conduce to the uniform distribution of road metal upon the road.

The frame may be of any suitable character, but I have illustrated two parallel, longitudinally extending channel irons 10 as forming part of this frame, these channel irons being connected by a transverse channel iron 11 and by medial, transverse channel irons 12 and 13. The forward wheels 14 are the steering wheels of the machine and the rear wheels 15 are the driving wheels. These are carried in suitable bearings upon the frame, as will be later more fully stated. Thus, for instance, the front wheels are mounted upon knuckles, in turn pivotally connected to brackets 16 which are mounted upon longitudinally extending frame bars 17 extending between the channel irons 11 and 12. These brackets 16 extend horizontally outward and the spindles 18 are pivotally mounted in the extremities of the brackets 16 in the usual manner. The wheels 14 have any usual or suitable anti-friction bearings upon the spindles 18. Both the spindles 18 are provided with rearwardly extending arms 19 connected by a steering rod 20 of any usual or suitable construction. The middle of this steering rod 20 is pivotally connected to an arm 21 projecting out from and forming part of a sector gear 22. This steering sector 22 is toothed upon its arcuate end for engagement with a worm 23 carried by a shaft 24 which extends laterally of the machine, is mounted in suitable bearings, and carries upon it the beveled gear wheel 25. This beveled gear wheel is engaged by a beveled gear wheel 26 mounted upon a steering shaft 27 which extends upward and forward and carries upon it the steering wheel 28.

This steering wheel 28 has the usual means for advancing or retarding the spark of the engine or controlling the throttle thereof. The steering shaft 27 extends upward at one end of a distributing hopper 29, which may be of any suitable construction, which is open at its top, and whose front and rear walls extend downward and forward. The bottom 30 of the hopper extends downward and rearward and the rear wall 31 and this bottom wall 30 at their lower ends are deflected downward, as at 32, so as to form a throat for the distributing hopper. Brackets 33 extend downward and forward and support a transversely extending foot board 34 which is also supported by means of vertical braces or hangers 35 extending downward from the upper end of the bottom of the hopper 30. This foot board 34 is hence disposed at the very forward end of the machine slightly in advance of the mouth of the hopper.

The rear axle 36 carries the wheels 15. These wheels 15 are loose upon the rear axle and each wheel 15 carries a sprocket wheel 16. The outer ends of the rear axle 36 are mounted in sliding bearings 37 (see Figure 7). These bearings include a plate 38 which extends down against the inner face of the corresponding longitudinal beam 10 and is angularly extended, as at 39, beneath the beam. This plate 38 is formed with a longitudinally extending slot 40 and through this slot and through the corresponding beam 10 a bolt 41 passes. Attached to each of the beams 10 is a bracket 42, through which an adjusting screw 43 passes and bears against the bearing 37, this adjusting screw being held in adjusted position by lock nuts or any other suitable means. The rear axle 36 is adjustable for the purpose of tightening up the chain which passes around the sprocket wheel 16. Adjustable with the axle 36 is a brake beam 44 (Figure 3) which is of angle iron and which is engaged with two longitudinally extending angle irons 45 disposed inward of the wheels 15, the rear ends of these angle irons being provided with yokes 46 bolted to the angle irons and extending over the axle. Mounted in suitable bearings adjacent the rear ends of the angle irons 45 is a transverse shaft 47 having arms 48, to which are pivotally attached, as by bolts 49, the brake shoes 50 which are adapted to bear against the peripheries of the wheels 15. The inner end of this shaft 47 is provided with an arm 51, to which a sectional link is connected, the link being composed of two sections 52 and an intermediate screw-threaded section 53 whereby the two sections may be drawn toward each other or forced away from each other. Each link composed of the sections 52 and 53 is connected to an arm 54 on a shaft 55, which shaft carries at one end a downwardly depending arm 56 having pivoted thereto a link 57 which at one end is angularly bent, as at 58, and through this lug 58 the brake rod 59 passes, this brake rod carrying a nut 60 at one end, and between this nut and a lug 58ª is disposed a coiled compression spring 61. The inner end of each angle iron 45 is slidingly engaged with a bracket 62 which is attached to the beam 13, this bracket 62 being provided with a slot 63, and one or more bolts 64 pass through this slot and through the end of the corresponding angle iron 45. Thus it will be seen that the brake mechanism is adjustable with the longitudinal adjustment of the rear axle 36 so that the brake shoes always preserve the same distance from the wheel without regard to the adjustment of the wheel. The brake rod 59 extends forward to a point adjacent the foot board 34 and is there pivotally connected to an upwardly projecting arm 65 pivotally mounted on a suitable supporting bracket 66 and having a brake pedal 67. This brake pedal operates on sector teeth formed upon the bracket 66 and has a pawl 68 whereby the brake pedal may be held in any adjusted position with the brakes applied.

Mounted upon the rear end of the supporting frame is a receiving hopper 69, the top of which is open, and mounted in the receiving hopper are a plurality of sprocket wheels 70 over which pass the sprocket chains 71 carrying the elevator buckets 72. A plurality of upwardly and forwardly extending supporting beams 73 extend upward and forward from the receiving hopper and are operatively connected to the upper end of the distributing hopper 29. The upper ends of these beams carry sliding bearings 74 in which is bolted a transverse shaft 75 upon which sprocket wheels 76 are mounted, over which the carrier chains 71 pass. The sliding bearings 74 are adjustable by means of adjusting screws 77 passing through yokes 78, there being nuts 79 bearing on each side of the yoke. Thus the sprocket chains 71 which, together with the buckets form the carrier, can be tightened from time to time. The upwardly and forwardly extending arms 73 are braced by transverse braces 80, and at the lower ends of these beams are carried the elevator boots 81, into which the buckets descend and through which they pass as the buckets pass around the wheels 70.

It will be seen that this construction provides means whereby the material discharged from a truck into the receiving hopper 69 may be carried up and discharged into the distributing hopper 29. The shaft 75 carries upon it the sprocket wheel 82 and over this sprocket wheel passes the sprocket chain 83 which passes around a relatively small sprocket wheel 84 mounted upon a shaft 85 carried in suitable bearings on a bracket 86 beneath the distributing hopper.

This shaft 85 also carries upon it a sprocket wheel 87, to which power is transmitted by means of a sprocket chain 88 connected to the driving mechanism of the machine, as will be later stated. This driving mechanism is also connected to the rear wheels as will be later described.

The lower end of the distributing hopper extends vertically downward to form a throat 89, and the lower end of this throat is partially closed by a plate 90 formed with a longitudinal discharge opening 91. Disposed below this plate 90 is a spreader or distributing plate 92 which extends along the whole width of the distributing hopper beneath the throat thereof, this distributing plate being mounted upon arms 93 which are pivoted, as at 94, these arms having rearwardly extending tails 95 against which the compression springs 90 bear so that the distributing plate 92 is urged away from the mouth of the distributing hopper by these springs 96. Extending transversely across the machine beneath the distributor plate is a shaft 97 provided with cams 98 somewhat in the form of ratchet wheels which bear against lugs 99 projecting downward from the arms 93. As the shaft 97 is rotated, these cams will give a vertically vibratory movement to the distributor plate so that the particles of stone upon this distributor or spreader plate will be shaken thereover. The distributor or spreader plate 92 is provided with a plurality of upwardly extending agitator pins 100 which extend up through the opening in plate 90 and act to agitate the material in the throat of the distributing hopper and prevent the material from clogging in this throat.

For the purpose of controlling the flow of the material from the throat of the distributing hopper, I provide the longitudinally extending sliding gate 101, which gate is carried in suitable guides and is mounted upon one or more longitudinally extending, feed adjusting rods 102 which extend rearward through the webs of vertically extending channel irons 103. A coiled compression spring 104 extends around the rear end of each rod and bears against the nut 105 on the rear end of each rod so that the rods are urged rearward. The forward end of each rod passes through a supporting plate 106, and the forward end of each rod is screw-threaded for engagement by a nut 107. By tightening up on this nut it will be obvious that the corresponding rod 103 will be drawn forward against the action of the spring 104 and that as the nut is turned in the reverse direction the spring 104 will draw the rod rearward and that it shifts the gate 102. This gate 102 is notched at a plurality of points, as at 108, so as to pass the agitating pins 100. Mounted upon the shaft 97 is a sprocket wheel 109, over which passes a sprocket chain 110, this sprocket chain passing over a sprocket wheel 111 on the shaft 85, which shaft, as before stated, is operatively connected to a sprocket chain 88 with the power.

In order to provide for adjusting the spreader or distributing plate 92 nearer to or further from the mouth of the hopper 29, I provide a lifting lever 112 pivotally mounted at 113 having a rearwardly extending arm 114 which is connected by a link 115 to the distributor plate, this lever 112 operating over a sector 116 having a toothed rack with which a hand operated latch engages. This latch is of any conventional construction. It will be understood that the link 115 passes loosely through the distributor plate so as not to interfere with the vertical oscillating movement of the spreader plate under the action of the cam 98, but by adjusting the lever 112 the spreader plate may be lifted or lowered. If the spreader plate is lifted slightly it will, of course, reduce the extent of its oscillation under the action of the cam 98, and if it be lifted to its full extent it will close the discharge mouth of the distributing hopper 29 so as to prevent the discharge of stone therefrom.
The engine and the transmission mechanism therefor are disposed in transverse line midway between the receiving hopper and the distributing hopper. The engine or motor as illustrated is of an ordinary conventional internal combustion type and requires no special description, as any suitable motor may be employed. The crank shaft 117 extends out below the radiator 118 at one side of the machine so that it may be readily started by means of the usual crank. The crank shaft is connected to the main shaft 119 of the transmission gearing by means of the usual engine clutch disposed in the housing 120, this clutch being actuated by a transverse shaft 121 having an arm to which the actuating rod 122 of the clutch is operatively connected. This rod 122 is connected to a manually operable actuating means, as will be later described.
The movable clutch member within the housing 120 is mounted upon a shaft having a flexible coupling 123 to the shaft 119. This shaft 119 is mounted in the usual bearings. Extending parallel to the shaft 119 are the counter-shafts 124, 125 and 126 and the driving shaft 127. Mounted upon the shaft 119 is the pinion 128 which meshes with the gear wheel 129 carried upon the counter-shaft 124. This counter-shaft 124 carries upon it the two pinions 130 and 131. Mounted upon shaft 119 is the sliding gear wheel 132 adapted to be shifted longitudinally upon the shaft 119 and engage with either of the pinions 130 or 131. The pinion 131 engages a gear wheel 133 mounted upon a shaft 134, which shaft extends out of the gear case 135 and carries upon its outer end the spiral jaw clutch member 136 having beveled teeth engaging with beveled clutch teeth 137 upon a sleeve 138, which sleeve carries the sprocket wheel 139, from which the sprocket chain 88 leads to the sprocket wheel 87 on shaft 85. A counter-clockwise rotation of shaft 134 will cause a counter-clockwise rotation of the sprocket wheel 139 and will hence drive the sprocket wheel 87 and this sprocket wheel 87 in turn from the shaft 85 and the sprocket wheels mounted thereon will drive the agitator shaft 97 and elevator shaft 75 so long as the machine is moving forward. Upon a rearward movement of the machine, however, the clutch member 136 will move outward by reason of its teeth riding over the beveled teeth 137 and power will not be transmitted to the sprocket wheel 139.

Mounted upon the counter-shaft 126 is a gear wheel 140, with which the gear wheel 132 meshes when the gear wheel 132 is in the position illustrated in Figure 2. Also mounted upon this shaft 126 is a pinion 141 and on the counter-shaft 125 is a pinion 142 with which the gear wheel 132 is adapted to mesh when the gear wheel 132 is in mesh with the pinion 131. Also mounted on shaft 125 is the pinion 143 which meshes with gear wheel 140. Carried upon shaft 127 is the low speed gear wheel 144 and the high speed gear wheel 145. Coacting with the low speed gear wheel 144 is a pinion 146 which is slidingly mounted upon the shaft 126 so that it may be shifted into or out of engagement with the low speed gear wheel 144. The pinion 141 is slidingly mounted upon the shaft 126 and may be shifted into or out of engagement with the high speed gear wheel 145. When it is desired to drive the machine ahead at low speed, the shaft 119 is driven in a counter-clockwise direction and this, through pinion 128, drives the gear wheel 129 and the shaft 124 in a clockwise direction. Thus the pinion 130 is rotated in a clockwise direction, which drives the loose gear 132 in a counter-clockwise direction. At this time the gear 132 meshes directly with gear 140, driving gear 140 and the shaft 126 in a clockwise direction. This through pinion 146 drives the low speed gear wheel 144 and shaft 127 in a counter-clockwise direction and this movement is transmitted to the driving wheels of the vehicle through the sprocket chains 147 engaging with the sprocket wheels 16. If it be desired to drive the machine forward at high speed, the pinion 146 is shifted out of engagement with the low speed gear wheel 144 and the pinion 141 is shifted into engagement with the high speed gear wheel 145. If it be desired to reverse the machine and drive it backward, then the reversing gear

132 is shifted from its engagement with pinion 130 and gear wheel 140 into engagement with the pinions 131 and 142, thus reversing the motion of the parts in an obvious manner.

The shifting of the various gear wheels and the engine clutch is accomplished by means of a series of longitudinal concentric shafts. The innermost shaft is the differential clutch shaft and is designated 148 (Figure 10). Immediately surrounding the differential clutch shaft is the tubular shaft 149 carrying an arm 150, from which a link 151 extends to a yoke embracing a collar 152 on the sliding gear 146. Surrounding the shaft 149 is a tubular shaft 153 having a like arm connected by a link 154 and yoke to the sliding gear 141. Surrounding the shaft 153 is the tubular shaft 155 having an arm connected by a link 156 and yoke to the sliding gear 132, and surrounding this shaft 155 is a tubular shaft 157 having an arm 158, from which extends the link 22 engaging the engine clutch. These several shafts 148, 149, 153, 155 and 157 are provided at their ends immediately above the foot-board with levers 159 whereby the several shafts may be manipulated to shift the engine clutch in or out to shift the reverse gear 132 from engagement with the pinion 130 to engagement with the pinion 131, or vice versa to shift the pinion 146 into or out of engagement with the low speed gear 144 or shift the pinion 141 into or out of engagement with the high speed gear 145 and to operate the differential clutch on shaft 127. It will be understood that the shaft 127 has mounted thereon at one end the sprocket wheel 160 and has at its opposite end loosely mounted thereon the sprocket wheel 161 (Figure 8). The sprocket wheel 161 has a clutch face 162, and mounted upon the shaft 127 for rotation thereon is the clutch member 163 urged into engagement with the clutch teeth 162 by means of the spring 164 and drawn out of engagement by the yoke 165 mounted upon the shaft 148. By this means it is possible to drive both of the main drive wheels 15 positively from the engine or positively drive either one of these traction wheels and let the other traction wheel run free, thus permitting the machine to turn curves.

While I have illustrated the details of a complete machine of this kind, I do not wish to be limited to these details. It is perfectly obvious, for instance, that another form of transmission gearing might be used for the purpose of transmitting the power of the engine to the elevator, the bearing cam, and to the drive wheels of the machine, but while other mechanisms might be used for this purpose it will be seen that the mechanism which I have devised provides for a proper distribution of weight, provides for complete control over the transmission so as to secure two speeds, either forward or reverse, and provides for this control being exercised by an operator standing upon the foot board at the front of the machine where he can look directly down upon the road and control the machine in consonance with the exigencies of any particular situation.

Heretofore in the surfacing of roads, piles of screenings are dumped at regular distances along the highway and these screenings or chips are scattered by shovels over the fresh asphaltum or tarvia forming the surface of the roadway. This hand distributing process is very expensive as well as inefficient, for the reason that the material has to be hauled out and piled; second it has to be scattered by hand and shoveled, a shovelful at a time. This is obviated by my machine. The machine will be on the highway behind the road oiler or asphaltum distributor. A regular end dump truck will back up to the receiving hopper and dump its load into the hopper, the top of which is about twenty-six inches from the road bed. The elevators will then be put in operation and will deliver the material into the hopper at the front end of the machine. After the hopper at the front end of the machine and the hopper at the rear end of the machine are full, the machine can be started over the oiled or asphalted roadway. The screenings will be permitted to escape by gravity at the front end of the machine and in front of the steering wheels so that it will not be necessary for the wheels of the machine to travel over the fresh asphaltum. The agitator will keep the stones loose and running freely out of the discharge opening of the distributor, and the area of this opening can be controlled by the slide 101 in the manner heretofore stated. It will be understood that this distributor will operate with small stone chips, screenings, gravel, or sand, and attention is called to the fact that in this construction the stone is distributed from the front end of the machine.

It has heretofore been proposed to provide a distributing machine of this general character with the distributing mechanism at the rear end of a motor driven truck and to back the motor truck along the roadway. Such a machine, however, is not practical for the reason that it is well-nigh impossible to back a motor truck to its work and properly steer it. If, on the other hand a motor truck is run as it should be, then the distributing mechanism is at the rear end of the truck and, as a consequence the wheels have to travel over the freshly oiled or asphalted roadway.

I claim:—

1. A motor operated distributing machine having forward steering wheels and rear driving wheels, a downwardly discharging distributing hopper mounted upon the machine forward of the steering wheels, and means disposed at the forward end of the machine controlling the motor, the steering wheels and the distribution from said hopper.

2. A distributing machine of the character described including a distributing hopper at the forward end of the machine having a downwardly directed discharge mouth, a receiving hopper on the machine, and a conveyor transmitting material from the receiving to the distributing hopper.

3. A distributor of the character described including a supporting frame, driving wheels and steering wheels therefor, a motor transmission, gearing operatively connecting the motor with the driving wheel, a distributing hopper carried by the frame and disposed at the forward end thereof forward of the steering wheels, a support for an operator at the forward end of the frame, and means for controlling the motor and transmission gearing and controlling the steering wheels of the machine disposed at the forward end of the frame.

4. A distributing machine of the character described including a supporting frame, driving wheels at the rear end of the frame, steering wheels at the forward end of the frame, a motor disposed between the driving and steering wheels and operatively connected to the driving wheels, a receiving hopper at the rear end of the frame rearward of the driving wheels, a distributing hopper mounted on the frame forward of the steering wheels, and a motor operated conveyor transmitting material from the receiving hopper to the distributing hopper.

5. A distributor of the character described including a supporting frame, front steering wheels and rear driving wheels supporting the frame, a distributing hopper mounted on the frame in advance of the steering wheels, a receiving hopper mounted on the frame rearward of the driving wheels, a motor operated conveyor transmitting materials from the receiving hopper to the distributing hopper, a support for an operator at the forward end of the machine, and controlling means for the steering wheels and for the motor disposed at the forward end of the frame adjacent said support.

6. A distributor of the character described including a supporting frame, steering wheels adjacent the forward end of the frame, driving wheels adjacent the rear end of the frame, a motor disposed between the steering and driving wheels, transmission gearing operatively connecting the motor with the driving wheels, a distributing hopper carried by the frame forward of the steering wheels thereof, a receiving hopper carried by the frame rearward of the driving wheels, a motor operated conveyor transmitting material from the receiving hopper to the distributing hopper, a support for an operator disposed at the forward end of the frame, and means disposed at the forward end of the frame for controlling the discharge from the distributing hopper, controlling the transmission gearing, controlling the steering wheels, and controlling the conveyor.

7. A distributor of the character described including a wheeled supporting frame, a distributing hopper having a downwardly discharging mouth, a distributing member mounted below said mouth and upon which the material from the hopper discharges, and means for oscillating said distributing member.

8. A distributor of the character described including a wheeled supporting frame, motor operated means for driving the distributor, a downwardly discharging distributing hopper, a distributing plate disposed below the hopper and upon which the hopper discharges, and motor operated means for vertically oscillating the plate.

9. A distributor of the character described including a wheeled supporting frame, motor operated means for driving the distributor, a downwardly discharging distributing hopper, a distributing plate disposed below the hopper and upon which the hopper discharges, motor operated means for vertically oscillating the plate including a motor operated cam operatively engaging the plate, and a spring urging the plate against the cam.

10. A distributor of the character described including a wheeled supporting frame, a distributing hopper having a downwardly discharging mouth, a shiftable gate controlling the discharge through said mouth, a distributing plate disposed below the mouth of the hopper pivotally mounted for movement in a vertical plane, a spring urging the plate downward, and motor operated means for oscillating the plate.

11. A distributor of the character described including a wheeled supporting frame, a distributing hopper extending transversely across the frame and having a downwardly discharging mouth, a distributing plate extending transversely across the frame and disposed below the mouth and upon which the hopper discharges, and means for oscillating said plate.

12. A distributor of the character described including a wheeled supporting frame, a distributing hopper extending transversely across the frame and having a downwardly discharging mouth, a distributing plate extending transversely across the frame and disposed below the mouth and upon which the hopper discharges, means for oscillating said plate, and agitators mounted upon the plate and extending up into the hopper through the mouth thereof.

13. A distributor of the character described including a wheeled supporting frame, a distributing hopper extending transversely across the frame and having a downwardly discharging mouth, a distributing plate extending transversely across the frame and disposed below the mouth and upon which the hopper discharges, means for oscillating said plate, agitators mounted upon the plate and extending up into the hopper through the mouth thereof, and a gate manually shiftable across the mouth of the hopper to control the flow therefrom.

14. A distributor of the character described including a wheeled supporting frame, a transversely extending distributing hopper mounted thereon and having a downwardly opening mouth, a distributing plate disposed below the mouth and upon which the hopper discharges, the plate being pivotally mounted rearward of the mouth and having an extension beyond its pivot, a compression spring bearing against said extension and urging it upward and the distributing plate downward, and a cam engaging the distributing plate to cause the vertical oscillations thereof.

15. A distributor of the character described including a supporting frame, steering wheels mounted at the forward end of the frame, driving wheels at the rear end of the frame, a motor operatively connected to the driving wheels, a distributing hopper carried by the frame forward of the steering wheels, a receiving hopper mounted upon the frame rearward of the driving wheels, a conveyor coacting with the receiving hopper to carry material therefrom and discharge it into the upper end of the distributing hopper, and means operatively connected to the motor for driving said conveyor.

16. A distributor of the character described including a supporting frame, forward steering wheels and rear driving wheels therefor, a motor operatively engaged with the driving wheels, a transversely extending distributing hopper mounted upon the forward end of the frame and extending upward and rearward above the motor, a receiving hopper mounted at the rear end of the frame, and a plurality of conveyors driven by the motor and conveying material from the receiving hopper to the upper end of the distributing hopper.

17. A distributor of the character described including a supporting frame, steering wheels mounted upon the forward end of the frame, driving wheels operatively supporting the rear end of the frame and shiftable toward or from the steering wheels, sprocket wheels carried by the driving wheels, a motor mounted upon the frame, transmission gearing operatively connecting the motor with the driving wheels and including sprocket chains passing over said driving sprocket wheels, braking mechanism coacting with the driving wheels and shiftable therewith, a distributing hopper carried by the frame, a receiving hopper at the rear end of the frame, a motor operated conveyor conveying material from the receiving hopper to the distributing hopper, means disposed at the forward end of the frame for controlling the transmission mechanism, applying the brake, and controlling the feed from said distributing hopper.

18. A distributor of the character described including a supporting frame, front steering wheels mounted upon the frame, rear driving wheels mounted thereon, a motor mounted on the frame between the steering and driving wheels, transmission mechanism mounted on the frame between the steering and driving wheels and operatively connected to the motor and to the driving wheels, a transversely extending distributing hopper mounted upon the frame forward of the steering wheels and discharging downward, a support for an operator mounted in advance of the distributing hopper, a receiving hopper mounted at the rear end of the frame rearward of the driving wheels, and extending transversely of the frame, motor operated means for conveying material from the receiving hopper to the upper end of the distributing hopper and discharging thereinto, a steering shaft operatively connected to the steering wheels and disposed at one end of the distributing hopper and adjacent the operator's support, and means disposed at the forward end of the frame and adjacent the operator's support for controlling the discharge of material from the hopper and controlling the transmission gearing.

19. A distributor of the character described including a wheeled frame, a transversely extending, downwardly discharging distributing hopper mounted thereon and extending transversely thereof, a distributing plate disposed below the hopper and upon which the hopper discharges and pivotally supported rearward of the hopper, resilient means urging the plate away from the hopper, motor operated means for giving vertical oscillations to the distributing plate, and manually operable means for adjusting the distributing plate toward the hopper and limiting its movement away from the hopper.

20. A distributor of the character described including a wheeled frame, a transversely extending downwardly discharging distributing hopper mounted thereon and extending transversely thereof, a distributing plate disposed below the hopper and upon which the hopper discharges and pivotally supported rearward of the hopper, resilient means urging the plate away from the hopper, motor operated means for giving vertical oscillations to the distributing plate, manually operable means for adjusting the distributing plate toward the hopper and limiting its movement away from the hopper including a manually operable lever, and means for holding it in adjusted position, and a link connected to the lever and passing through an aperture in the distributing plate, the link having a stop engaging the under side of the distributor plate.

21. In a mechanism of the character described, a supporting frame, an axle mounted upon the frame for adjustment longitudinally thereof, beams supported by said axle at one end and at the other slidingly supported on said frame, brake shoes associated with the driving wheels and operatively supported upon said beams whereby said brake shoes will be shifted when the axle is shifted, and manually operable means for causing the brake shoes to operatively engage with or disengage from the wheels.

22. A distributor of the character described including a supporting frame, steering wheels mounted adjacent the forward end of the frame, driving wheels mounted adjacent the rear end of the frame, a distributing hopper at the forward end of the frame, a receiving hopper at the rear end of the frame, a motor disposed between the hoppers and mounted upon the frame and having a crank shaft extending transversely of the machine, transmission gearing disposed between the hoppers including a plurality of shafts extending transversely of the machine, said transmission gearing being operatively connected with the motor and with the driving wheels.

23. A distributor of the character described including a supporting frame, steering wheels supporting the forward end of the frame, driving wheels supporting the rear end of the frame, a motor mounted on the frame between the steering and driving wheels, transmission gearing disposed between the steering and driving wheels and operatively connecting the motor with the driving wheels, a rearwardly and upwardly extending hopper mounted upon the forward portion of the frame and having a downwardly discharging mouth at its rear end disposed forward of the steering wheels, the upper end of the hopper being open, a transversely extending receiving hopper mounted upon the frame rearward of the driving wheels and disposed to receive material from the dumping truck, an upwardly and forwardly extending motor operated conveying means acting to lift materials from the receiving hopper and discharge them into the upper end of the distributing hopper, a vibratory distributor mounted below the discharge end of the distributing hopper, motor operated means for vibrating the distributor, and manually operable means at the forward end of the machine for controlling the vibrations of the distributor, controlling the discharge of material from the distributing hopper, controlling the steering wheels, and controlling the transmission gearing.

24. A distributor of the character described, including a supporting frame, steering wheels and driving wheels supporting the frame, a distributing hopper mounted on the frame in advance of the wheels, a receiving hopper mounted on the frame rearward of the wheels, a motor operated conveyor transmitting material from the receiving hopper to the distributing hopper, a support for an operator at the forward end of the machine, and controlling means for the steering wheels and for the motor disposed at the forward end of the frame adjacent said support.

In testimony whereof I affix my signature.

DAVID C. BOYD.